(12) United States Patent
Perfetta

(10) Patent No.: US 7,752,424 B2
(45) Date of Patent: Jul. 6, 2010

(54) NULL VALUE CHECKING INSTRUCTION

(75) Inventor: Rodolph Gérard Jacques Ascanio Jean-Denis Perfetta, Cambridge (GB)

(73) Assignee: ARM Limited, Cambridge (GB)

( * ) Notice: Subject to any disclaimer, the term of this patent is extended or adjusted under 35 U.S.C. 154(b) by 356 days.

(21) Appl. No.: 11/889,058

(22) Filed: Aug. 8, 2007

(65) Prior Publication Data
US 2009/0043989 A1     Feb. 12, 2009

(51) Int. Cl.
*G06F 9/305*     (2006.01)
(52) U.S. Cl. ...................... 712/223; 712/225
(58) Field of Classification Search .................. None
See application file for complete search history.

(56) References Cited
U.S. PATENT DOCUMENTS
6,009,517 A * 12/1999 Bak et al. ................... 712/245

| | | | |
|---|---|---|---|
| 6,374,286 B1* | 4/2002 | Gee et al. | 718/108 |
| 6,782,407 B1* | 8/2004 | Goff et al. | 718/1 |
| 2004/0049658 A1* | 3/2004 | Kabasawa et al. | 712/209 |
| 2004/0177232 A1* | 9/2004 | Hooker | 712/200 |
| 2005/0278316 A1* | 12/2005 | Carlson et al. | 707/3 |
| 2006/0026396 A1* | 2/2006 | Lesot et al. | 712/223 |
| 2007/0033576 A1* | 2/2007 | Tillmann et al. | 717/124 |

OTHER PUBLICATIONS

Chang, L.C. etal., Stack operations folding Java processors, Nov. 1997, IEE Proc.-Comput. Digit.Tech., vol. 145, No. 5, pp. 333-340.*

* cited by examiner

*Primary Examiner*—Eric Coleman
(74) *Attorney, Agent, or Firm*—Nixon & Vanderhye P.C.

(57) ABSTRACT

A processor 2 is provided with the ability to execute program instructions in the form of Java bytecodes including a dedicated null checking instruction. The null checking instruction reads the top of stack value, compares this with a null value and jumps to an exception handling routine if the top of stack value equals the null value, otherwise the next program instruction is executed.

18 Claims, 4 Drawing Sheets

NULL VALUE CHECKING INSTRUCTION

BACKGROUND OF THE INVENTION

1. Field of the Invention

Figure 1:
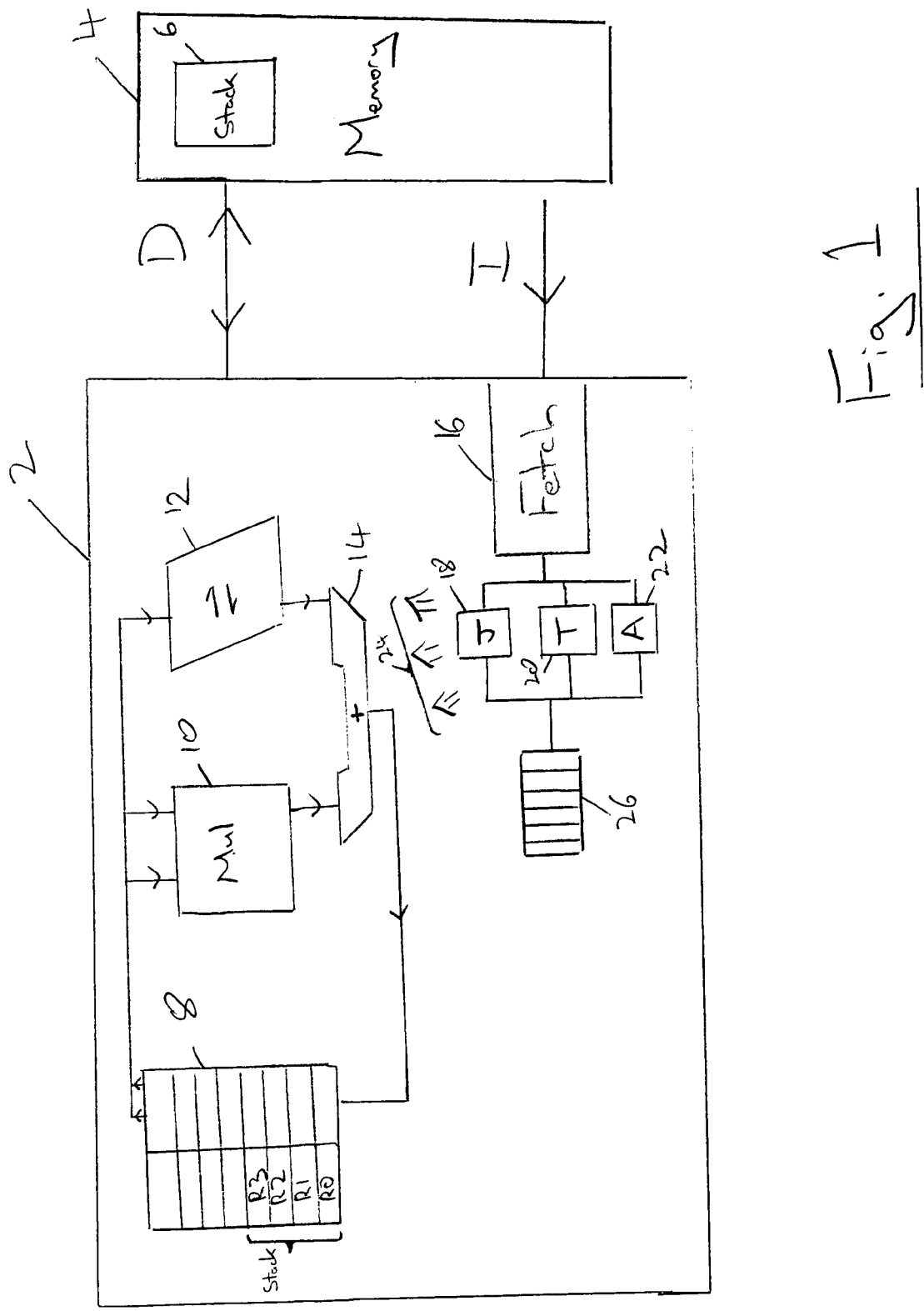

This invention relates to the field of data processing systems. More particularly, this invention relates to data processing systems in which null value checking is required.

2. Discussion of Prior Art

It is known to provide data processing systems, such as those operating using computer programs written in the Java programming language, which require null value checking to be performed. If a null value is detected, then null value exception processing should be initiated. Many Java programs are executed using virtual machine systems in which the Java instructions are translated into sequences of native instructions for the underlying processor and then executed. As part of this translation program instructions from the underlying native instruction set of the processor may be generated that serve to perform null value checking corresponding to the null value checking implicit within the Java program. The program into which the Java program is translated and using the native instruction of the underlying processor can include instructions such as the CZB instruction in the Thumb-2 instruction set of the processor of ARM Limited, Cambridge, England which can be used to detect a null value and then branch to appropriate code to trigger an exception. The Thumb-2 instruction set provides the ability to specify sufficient operands/fields to permit such behaviour without significant modification. Such behaviour cannot be readily supported by the existing Java bytecodes themselves.

Another type of processor for executing Java programs is one which seeks to execute Java bytecodes as native instructions and effectively to support the Java bytecodes as a native instructions set. One example of such systems are the Jazelle enabled processors produced by ARM Limited of Cambridge England as described in PCT Published Application number WO/A/2002/097613.

Whilst providing processors capable of natively executing Java bytecodes can be an efficient approach in some respects, e.g. memory usage, when high speed operation is required the approaches of compiling the Java coding into native code of an underlying processor, such as by just-in-time compilation, has considerable advantages, such as greater possibilities for multiple issue processing, output-of order processing and the like.

SUMMARY OF THE INVENTION

Viewed from one aspect the present invention provides apparatus for processing data, said apparatus comprising: a stack memory; instruction decoder circuitry responsive to program instructions to generate control signals; and data processing circuitry coupled to said stack memory and controlled by said control signals to perform data processing operations upon data values stored in said stack memory; wherein said instruction decoder circuitry is responsive to a null check instruction to generate control signals that control said data processing circuitry to perform a dedicated null checking operation comprising: (i) reading a data value from said stack memory; (ii) comparing said data value with a null value; (iii) if said data value matches said null value, then jumping to execution of a null value exception handler stored at an address independent of said null check instruction; and (iv) if said data value does not match said null value, then proceeding to a next program instruction.

The present technique recognises that whilst executing program instructions natively without requiring a translation or compilation process might not be regarded as the main approach when high speed performance is required, there are nevertheless significant gains to be made by identifying bottlenecks in the processing provided by such native execution and taking measures to reduce those bottlenecks. The present technique recognises that a particular bottleneck in the processing arises due to the requirement to perform null value checking in respect of program instructions that require execution.

Whilst some of the bytecodes having a null value check requirement associated with their operation, (e.g. a load from memory), may have a null value check built-into their operation and supported by the hardware, there exist many other instructions and situations, typically more complex, which require such null value checking and where this is not normally provided. One possibility would be to add additional bytecodes serving to perform such null value checking prior to execution of the required program instructions, but this represents a disadvantageous performance overhead. This is particularly the case when the programs involve tight program loops where the null checking might require four or five additional bytecodes and ten or more additional processing cycles and would represent a significant performance overhead associated with that tight programming loop. Having recognised this particular bottleneck in processing, the present technique provides the solution of a dedicated null check instruction which serves to read a data value from the stack memory, compare that data value with a null value and jump to a null value exception handler at an address defined independently of that instruction if the data value matches the null value. Whilst there would normally be a technical prejudice against adding additional program instructions to an instruction set so as to preserve instruction set bit space, the advantages associated with the null check instruction of the present technique are such that the instruction bit space consumed is more than justified by the additional performance which is achievable. Furthermore, the introduction of such dedicated null check instructions into the instruction flow in association with the instructions which are actually required nevertheless increases overall performance by enabling the replacement of longer sequences of general purpose program instructions which would otherwise be required in many circumstances. The use of an address for the null value exception handler that is defined independently of the instruction permits this behaviour to be efficiently provided and recognises that the flexibility to define the jump address on an instruction-by-instruction basis is not in practice needed.

It will be appreciated that the null value exception handler which is invoked when the data value read equals the null value could take a variety of different forms but may conveniently a null value exception handler which is shared with those other program instructions which incorporate a null value check with further processing operations which they already perform. The null value exception handler need not be specifically provided for use with the null checking instruction and thus the additional overhead associated with adding the null value checking instruction to the system is reduced.

Whilst it is possible that the null checking instruction could leave the stack unaltered, it has been found convenient and applicable to many circumstances that the null checking instruction should pop the data value from the stack memory as it is read there from. Whilst it may be necessary to reload the data value back onto the stack memory in some circumstances, nevertheless, in a large number of circumstances, popping the data value which has been null value checked is required and accordingly efficiency can be increased by building this operation into null value check.

Whilst the present techniques could be used with a wide variety of different programming languages, they are particularly suited to use with Java bytecodes.

The stack memory from which the data value is read can be provided in a number of different ways, such as a special purpose dedicated on-chip stack memory, a general purpose memory with a stack pointer, or in some embodiments with a top portion of the stack memory provided in one or more registers within a register file coupled to the data processing circuitry. Providing the top portion of the stack memory in this way increases the speed of access to the top portion of stack memory stored in the registers and accordingly enables higher performance to be achieved.

The null value exception handler is stored at a predetermined location that need not be specified by the null checking instruction. This enables the null checking instruction to be smaller and does not restrict the utility of the instructions since the null value exception handler does not need to differ for differing occurrences of null value exceptions.

The null value exception handler can be stored at a fix address, or at a pre-configured address if desired. One convenient way of pre configuring the address of the null value exception handler is to include a pointer to the null value exception handler within a bytecode table which also provides pointers to code to perform processing specified by one or more bytecodes where the entry within the bytecode table used for the null value exception handler is outside the range of possible bytecode values for program instructions and accordingly does not overlap with a position in the table which would be required for other purposes.

It will be appreciated that the null value for which a check is made could have a variety of different absolute values. However, it is convenient in at least some embodiments that the null value should be zero and such a null value can be readily checked for by hardware which will typically often already be provided within a processor.

Viewed from another aspect the present invention provides a method of processing data with an apparatus having a stack memory, said method comprising the steps of: in response to a null check instruction, performing a dedicated null checking operation comprising: (i) reading a data value from said stack memory; (ii) comparing said data value with a null value; (iii) if said data value matches said null value, then jumping to execution of a null value exception handler stored at an address independent of said null check instruction; and (iv) if said data value does not match said null value, then proceeding to a next program instruction.

Viewed from a further aspect the present invention provides a virtual machine providing an emulation of an apparatus for processing data, said apparatus comprising: a stack memory; instruction decoder circuitry responsive to program instructions to generate control signals; and data processing circuitry coupled to said stack memory and controlled by said control signals to perform data processing operations upon data values stored in said stack memory; wherein said instruction decoder circuitry is responsive to a null check instruction to generate control signals that control said data processing circuitry to perform a dedicated null checking operation comprising: (i) reading a data value from said stack memory; (ii) comparing said data value with a null value; (iii) if said data value matches said null value, then jumping to execution of a null value exception handler stored at an address independent of said null check instruction; and (iv) if said data value does not match said null value, then proceeding to a next program instruction.

The above, and other objects, features and advantages of this invention will be apparent from the following detailed description of illustrative embodiments which is to be read in connection with the accompanying drawings.

BRIEF DESCRIPTION OF TIRE DRAWINGS

Figure 2:
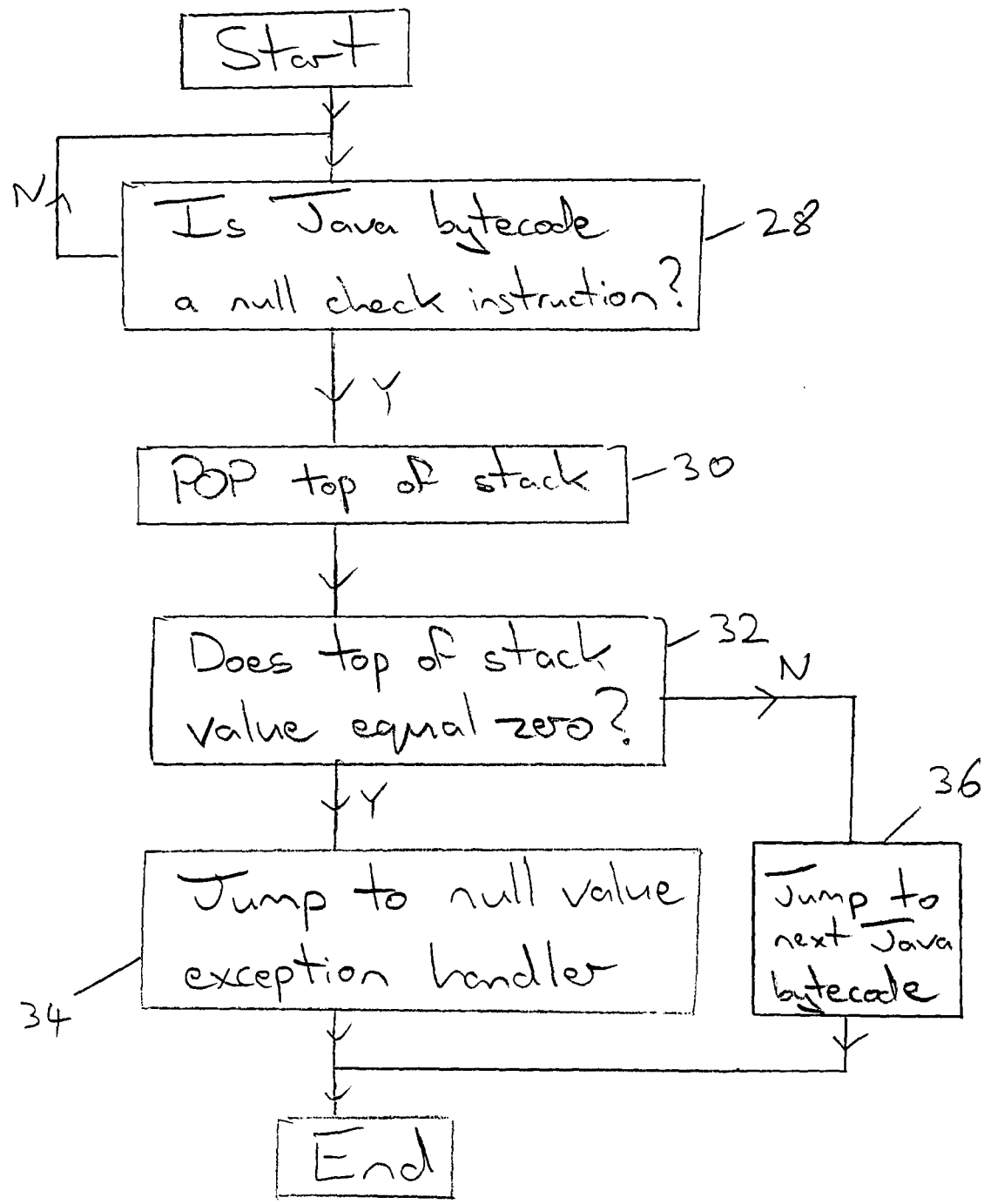
Figure 3:
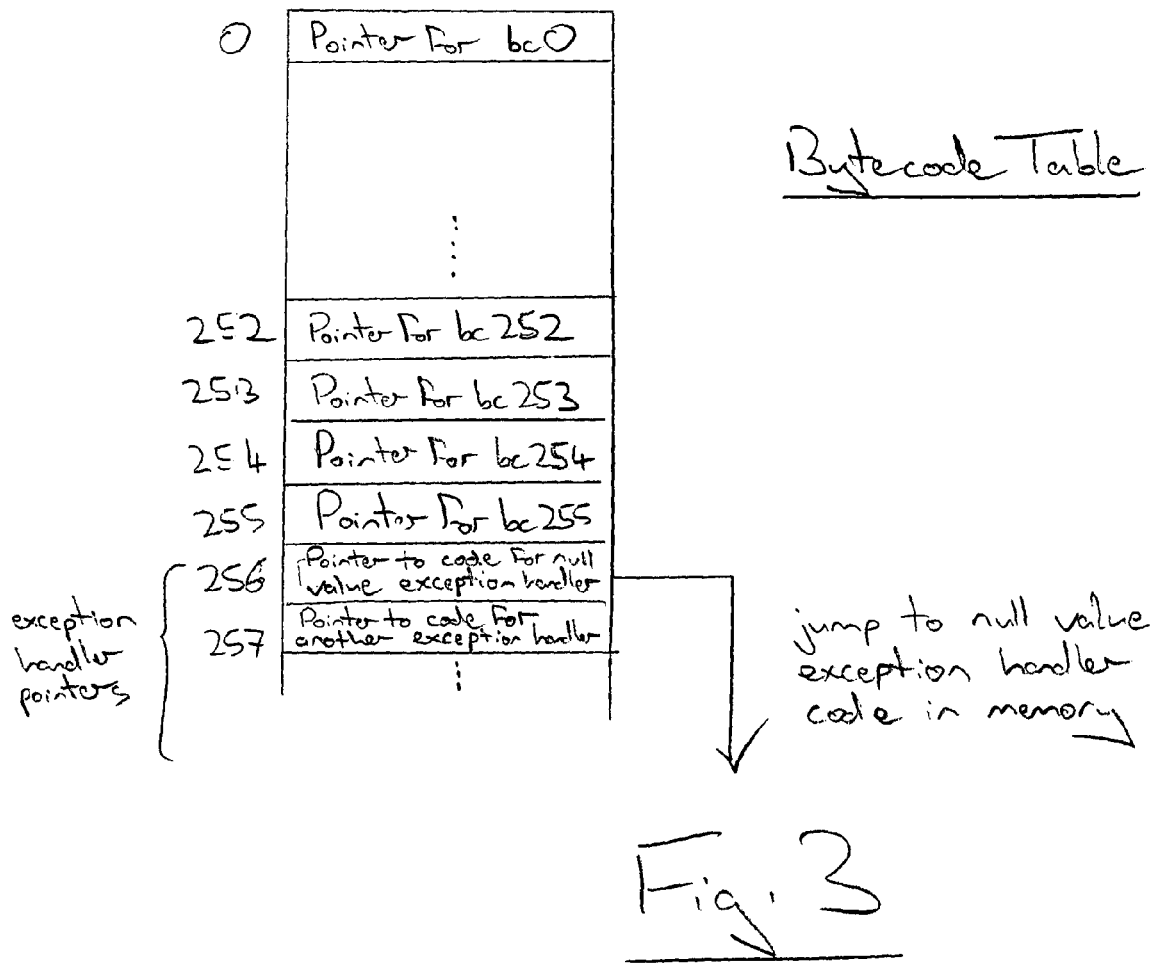
Figure 4:
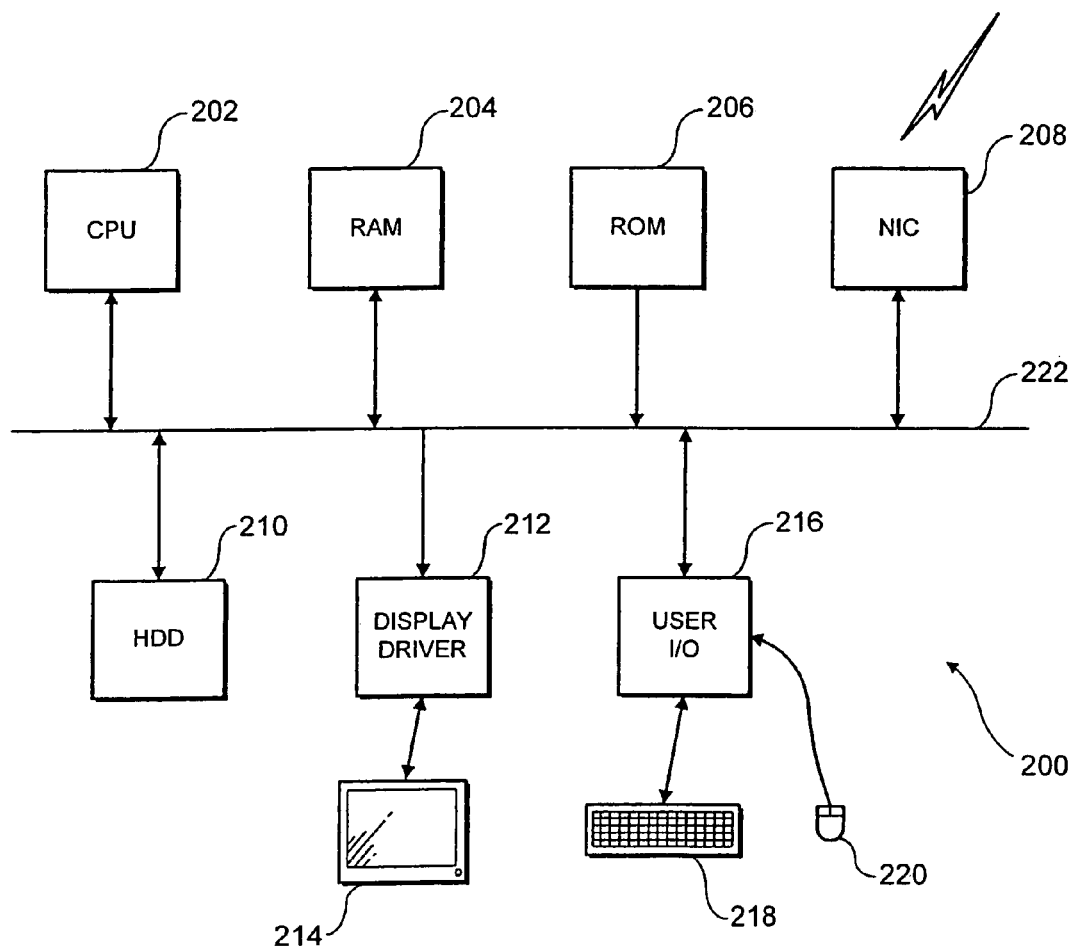

FIG. 1 schematically illustrates a data processing system suitable for executing Java bytecode program instructions;

FIG. 2 is a flow diagram schematically illustrating the processing performed in response to decoding of a null check instruction;

FIG. 3 schematically illustrates a bytecode table within which a pointer to a null value exception handler may be stored; and FIG. 4 is a diagram schematically illustrating a general purpose computer of a type which may be used to provide a virtual machine implementation of a processor suitable for executing null checking instructions.

DETAILED DESCRIPTION OF EMBODIMENTS

FIG. 1 illustrates a processor 2 coupled to a memory 4. The memory 4 stores data values to be subject to data processing operations including data values within a stack memory 6. The memory 4 also includes program instructions to be executed. These program instructions can be taken from a plurality of different instruction sets which are natively supported by the processor 2. These instruction sets may include ARM instructions, Thumb instructions and Java bytecodes. As previously discussed, processors of the type capable of supporting such multiple native instruction sets are described in PCT published application number WO/A/2002/097613 (the content of which is incorporated herein by reference).

Within the processor 2 are provided a register file 8, a multiplier 10, a shifter 12 and an adder 14 which together schematically represent the data path of the processor 2. It will be appreciated that the data path may in practice include additional and/or alternative elements. Program instructions are fetched from the memory 4 by a fetch unit 16 and are then decoded within one of a plurality of different instruction decoders 18, 20, 22 respectively provided for the different native instructions sets which are supported. One of these decoders 18, 20, 22 will be active at any given time depending upon the mode of the processor 2 and the currently active instruction set. The decoders 18, 20, 22, including the decoder 18 for Java bytecodes, serve to generate control signals 24 which are supplied to the elements of the data path 8, 10, 12, 14 to configure and control those elements of the data path 10, 12, 14 to perform the desired processing operations. Further stages within the instruction pipeline 26 serve to support execution, write back and other conventional processing stages.

It will be appreciated that the illustration of FIG. 1 is schematic and in many cases the processor 2 will include additional or different processing elements. The processor 2 could be a super scalar processor supporting multiple instruction issue, an in-order processor, an out-of order processor or another type of processor. These more advanced processor features may require additional stages within the instruction pipeline, such as a reordering stage, an issue stage and the like. Furthermore, multiple data paths may be provided and certain specific data paths, such as a load store data path, may be provided in addition to the more general purpose data paths.

In general, the operation of the processor 2 in receiving program instructions and then decoding those program instructions with instruction decoder circuitry 18, 20, 22 to generate the control signals 24 will be well understood by those in this technical field. The particular details of the elements provided within the data path 8, 10, 12 and 14 used to perform the desired data processing operations can vary. For example, a particular mathematical result can be achieved in a variety of different ways depending upon their design priorities of the processor 2, as will be familiar in this technical field.

The register file 8 illustrated in FIG. 1 includes 4 registers R0-R3 dedicated to storing a top portion of the stack memory contents. These registers R0-R3 provide high speed access to the uppermost 4 stack memory elements thereby increasing processing performance by avoiding the need to load and store from the stack memory 6 within that main memory 4.

FIG. 2 schematically illustrates the processing performed within the processor 2 by the data path elements 8, 10, 12, 14 in response to a null check instruction of the present technique. The instruction decoder circuitry 18 for the Java bytecodes serves to provide the control signals to control the data path 8, 10, 12 and 14 in the desired way in accordance with the flow diagram of FIG. 2. At step 28 the decoder waits for a Java bytecode that is a null check instruction to be received. When such an instruction is received, step 30 serves to pop the top of stack value from the register file 8. Step 32 then checks this top of stack value to determine whether or not it equals zero (the null value used in this example embodiment other values are possible). If the determination at step 34 is that the top of stack value is equal to zero, then processing proceeds to step 44 at which a jump is made to a null value exception handler using a pointer stored within a bytecode table as will be described later. The null value exception handler can operate in accordance with the known techniques for such null value exception handlers, these being already known in the context of instructions which have implicit null value checking associated therewith. If the determination at step 32 was that the top of stack value does not equal zero, then processing proceeds to step 36 at which a jump is made to the next Java bytecode (next in program order) since the null value check has proven negative. It will be appreciated that the processing illustrated in FIG. 2 is a dedicated null value checking operation and other processing operations, such as loads, are not performed in conjunction with the null checking operation illustrated. The null check instruction is thus dedicated to this purpose and can be prefixed to many other program instructions which require a null value check. There is a single bytecode overhead associated with the null checking instruction and the processing operations performed are relatively straight forward and accordingly would normally be expected to be achieved within a single processing cycle thus representing a low overhead in providing the null value checking within a processor supporting native bytecode execution.

FIG. 3 illustrates a bytecode table including respective pointers to code to perform processing specified by corresponding bytecodes should this be required. In practice the Java bytecodes are 8 bits in length and accordingly there are 256 different possible bytecodes which are supported. The bytecode table can be extended to include pointers to various exception handlers including a null value exception handler. This null value exception handler (a piece of software) can be shared by all of the instructions which involve null value checking and which can give rise to a null value exception. The further exception handlers may include handlers for dealing with exceptions such as unsupported instructions, divide by zero errors and the like.

FIG. 4 schematically illustrates a general purpose computer of the type which can be used to provide a virtual machine implementation of the processor 2 of FIG. 1 used to provide processing in accordance with the present techniques. It will be appreciated that it is possible to provide a virtual machine implementation of a processor 2 which is itself seeking to provide native instructions targeted at a virtual machine. Nevertheless, if the processor of FIG. 4 is of sufficiently high performance, then realistic overall processing throughput may be achieved and the advantages of being able to execute an existing code base including null checking instruction bytecodes in accordance with the present technique may justify the use of a virtual machine implementation employing a general purpose processor such as that of FIG. 4.

FIG. 2 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 2 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims

I claim:

1. Apparatus for processing data, said apparatus comprising:
   a stack memory;
   instruction decoder circuitry, responsive to program instructions, configured to generate control signals; and
   data processing circuitry, coupled to said stack memory and controlled by said control signals, configured to perform data processing operations upon data values stored in said stack memory, wherein said instruction decoder circuitry, in response to a dedicated null check instruction, is configured to generate control signals that control said data processing circuitry to perform only a dedicated null checking operation and no other operation, the dedicated null checking operation of said instruction decoder circuitry comprising:
   (i) reading a data value from said stack memory;
   (ii) comparing said data value with a null value;

(iii) if said data value matches said null value, then jumping to execution of a null value exception handler stored at an address independent of said null check instruction; and (iv) if said data value does not match said null value, then proceeding to a next program instruction.

2. Apparatus as claimed in claim 1, wherein said null value exception handler is shared by other program instructions that specify processing operations including null value checking with further processing operations.

3. Apparatus as claimed in claim 1, wherein said reading of said data value pops said data value from said stack memory.

4. Apparatus as claimed in claim 1, wherein said program instructions are Java bytecode instructions.

5. Apparatus as claimed in claim 1, wherein at least a top portion of said stack memory is provided by one or more registers within a register file coupled to said data processing circuitry.

6. Apparatus as claimed in claim 1, wherein said null value exception handler is stored at a preconfigured address.

7. Apparatus as claimed in claim 6, wherein said program instructions are Java bytecode instructions, a bytecode table provides pointers to code to perform processing specified by one or more bytecodes and said preconfigured address is stored as part of said bytecode table at a position corresponding to a value outside a range of possible bytecode values.

8. Apparatus as claimed in claim 1, wherein said null value is zero.

9. A method of processing data with an apparatus having a stack memory, said method comprising:

performing, in response to a dedicated null check instruction, a dedicated null checking operation and no other operations, the dedicated null checking operation comprising:

(i) reading a data value from said stack memory;
(ii) comparing said data value with a null value;
(iii) if said data value matches said null value, then jumping to execution of a null value exception handler stored at an address independent of said null check instruction; and
(iv) if said data value does not match said null value, then proceeding to a next program instruction.

10. A method as claimed in claim 9, wherein said null value exception handler is shared by other program instruction that specify processing operations including null value checking with further processing operations.

11. A method as claimed in claim 9, wherein said reading of said data value pops said data value from said stack memory.

12. A method as claimed in claim 9, wherein said program instructions are Java bytecode instructions.

13. A method as claimed in claim 9, wherein at least a top portion of said stack memory is provided by one or more registers within a register file coupled to said data processing circuitry.

14. A method as claimed in claim 9, wherein said null value exception handler is stored at a preconfigured address.

15. A method as claimed in claim 14, wherein said program instructions are Java bytecode instructions, a bytecode table provides pointers to code to perform processing specified by one or more bytecodes and said preconfigured address is stored as part of said bytecode table at a position corresponding to a value outside a range of possible bytecode values.

16. A method as claimed in claim 9, wherein said null value is zero.

17. A virtual machine providing an emulation of an apparatus for processing data, said apparatus comprising:

a stack memory;
instruction decoder circuitry responsive to program instructions to generate control signals; and
data processing circuitry coupled to said stack memory and controlled by said control signals to perform data processing operations upon data values stored in said stack memory; wherein
said instruction decoder circuitry is, responsive to a dedicated null check instruction, configured to generate control signals that control said data processing circuitry to perform a dedicated null checking operation and no other operation, the dedicated null checking operation of said instruction decoder circuitry comprising:

(i) reading a data value from said stack memory;
(ii) comparing said data value with a null value;
(iii) if said data value matches said null value, then jumping to execution of a null value exception handler stored at an address independent of said null check instruction; and
(iv) if said data value does not match said null value, then proceeding to a next program instruction.

18. Apparatus for processing data, said apparatus comprising:

stack memory means;
instruction decoder means for generating control signals in response to program instructions; and
data processing means, coupled to said stack memory and controlled by said control signals, for performing data processing operations upon data values stored in said stack memory; wherein
instruction decoder means, responsive to a dedicated null check instruction, for generating control signals that control said data processing means to perform a dedicated null checking operation and no other operation, the dedicated null checking operation of said instruction decoder means comprising:

(i) reading a data value from said stack memory means;
(ii) comparing said data value with a null value;
(iii) if said data value matches said null value, then jumping to execution of a null value exception handler stored at an address independent of said null check instruction; and
(iv) if said data value does not match said null value, then proceeding to a next program instruction.

* * * * *